United States Patent
Dalbiez et al.

(10) Patent No.: US 6,354,419 B1
(45) Date of Patent: Mar. 12, 2002

(54) CLUTCH MECHANISM WITH WEAR TAKE-UP DEVICE COMPRISING BALANCING MEANS

(75) Inventors: André Dalbiez, Argenteuil; Michel Graton, Paris, both of (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/403,228

(22) PCT Filed: Feb. 15, 1999

(86) PCT No.: PCT/FR99/00336

§ 371 Date: Jun. 13, 2001

§ 102(e) Date: Jun. 13, 2001

(87) PCT Pub. No.: WO99/41516

PCT Pub. Date: Aug. 19, 1999

(30) Foreign Application Priority Data

Feb. 13, 1998 (FR) .............................................. 98 01769
Dec. 9, 1998 (FR) .............................................. 98 15532

(51) Int. Cl.[7] .......................... F16D 13/58; F16D 13/25
(52) U.S. Cl. .............................. 192/70.25; 192/110 R; 192/111 A
(58) Field of Search ...................... 192/110 R, 111 R, 192/70.25, 111 A (56) References Cited

U.S. PATENT DOCUMENTS

| 4,228,883 | A | * | 10/1980 | Palmer ..................... 192/11 A |
| 4,611,702 | A | * | 9/1986 | Kayakabe et al. ...... 192/110 R |
| 5,127,505 | A | * | 7/1992 | Beccaris ................. 192/110 R |
| 5,816,379 | A | * | 10/1998 | De Briel et al. ......... 192/70.25 |
| 6,176,360 | B1 | | 1/2001 | Thirion De Briel et al. |
| 6,296,098 | B1 | | 10/2001 | Graton et al. |

FOREIGN PATENT DOCUMENTS

| FR | 2 783 580 | | 3/2000 |
| FR | 2 785 954 | | 5/2000 |
| GB | 2217798 | * | 11/1989 |
| GB | 2250069 | * | 5/1992 |

* cited by examiner

Primary Examiner—Rodney H. Bonck
Assistant Examiner—Saúl Rodríguez
(74) Attorney, Agent, or Firm—Liniak, Berenato, Longacre & White (57) ABSTRACT

The invention concerns a clutch mechanism, in particular for motor vehicle, comprising a cover (2), a pressure plate (1), support means (3) borne by the pressure plate (1), clutching means (4, 41), and a wear take-up device (30, 200) comprising a box (30) mounted in a housing (20) of the cover (2). The invention is characterised in that the cover bears at least one pre-balancing or balancing rivet (201) to compensate the imbalance caused by the wear take-up device box (30).

11 Claims, 4 Drawing Sheets

CLUTCH MECHANISM WITH WEAR TAKE-UP DEVICE COMPRISING BALANCING MEANS

BACKGROUND OF THE INVENTION

1. Field of the Invention

The present invention relates to a clutch mechanism, especially for a motor vehicle.

2. Description of the Related Art

In general terms the invention relates to a friction clutch, especially for a motor vehicle, and more particularly relates to a clutch equipped with a take-up or compensating device for wear which is due in particular to wear in the friction liner or liners, this device working to the extent that wear takes place in the liner or liners.

The invention relates to the friction clutch mechanism which is included in such clutches.

A conventional clutch mechanism includes, in particular, a rear cover plate, at least one front pressure plate coupled in rotation to the cover plate while being displaceable axially with respect to the latter, engagement means carried by the pressure plate, and axially acting clutch engagement means which act between the cover plate and the engagement means.

The clutch also includes a reaction plate which is part of an engine flywheel, which may be in two parts so as to form a damped flywheel or a flexible flywheel, mounted in rotation on a first shaft, which is typically a driving shaft such as the crankshaft of the internal combustion engine associated with the clutch, and supporting through its outer periphery the cover plate to which the pressure plate is attached with axial mobility.

The pressure plate is fixed in rotation to the cover plate and the reaction plate, while being displaceable axially under the action of axially acting clutch engagement means controlled by declutching means.

The declutching means may consist in a known way of helical springs, or two Belleville rings mounted in series, which are acted on by declutching levers that constitute the declutching means.

Generally, the clutch engaging and declutching means are both part of a common component, for example a metallic diaphragm which bears on the base of the cover plate. The diaphragm may be mounted in series or in parallel with a Belleville ring so as to provide assistance to the declutching force.

A friction disc, which typically carries friction liners at its outer periphery and which is fixed in rotation to a shaft, typically a driven shaft such as the input shaft of the gearbox of the propulsion engine unit, is interposed between the pressure plate and the reaction plate in such a way as to be gripped between them when the clutch is in its engaged position, for transmitting the torque from the driving shaft to the driven shaft. Conventionally, the friction liners are mounted on an axially elastic support member, which is coupled rigidly or elastically to a hub that is mounted in rotation on the driven shaft. Thanks to this arrangement, the friction disc assists the diaphragm during the declutching operation of the clutch.

In another version, the support is encapsulated within a friction liner, in such a way that the friction disc has only one liner and the support is axially rigid.

Conventionally, the clutch engaging means, the cover plate and the pressure plate are part of a unitary assembly which is referred to as a friction clutch mechanism.

The clutch engaging means control the axial displacement of the pressure plate when they are actuated by a clutch release bearing through declutching means.

In the course of the working life of such a clutch, the friction liner or liners and the counter-acting materials, pressure and reaction plates, become worn, which causes a variation to occur in the axial position of the pressure plate and that of the axially acting clutch engaging means, as well as the clutch release bearing, and the result of this is a variation in the gripping force exerted between the friction disc on the one hand and the pressure and reaction plates on the other, because of the modifications of the working conditions of the clutch engaging means. The force which is necessary for disengagement is thereby affected. By giving such a clutch a wear compensating device these disadvantages are avoided, and the clutch engaging means, together with the clutch release bearing, which is typically in constant engagement on the clutch engaging means, then occupies the same position when the clutch is in its engaged condition, so that the axial size of the clutch is reduced.

In French patent application FR-A-2 753 503, applied for on Sep. 17, 1996, there is proposed a wear compensating device which comprises, firstly, ramp means carried by the pressure plate, which carry an external set of teeth and which are placed between the pressure plate and the engagement means so as to constitute a pressure plate of variable thickness between its friction face and the engagement means, and including, secondly, a cassette which is mounted in a housing of the cover plate and which includes a worm in cooperation with the set of teeth of the ramp means, and of the type in which the engagement means, the external set of teeth and the ramps are all part of a single component, in the form of an annular ring carried by the pressure plate.

The worm of the cassette is in cooperation with the teeth of the set of teeth that are part of the adjusting ramp ring which is placed between the clutch engaging means and the pressure plate.

The worm is in cooperation both with the set of teeth and with means for driving in rotation which comprise a helical spring, and which are rendered operational by wear in the friction liners when the clutch is engaged. The worm is mounted tangentially with respect to the set of teeth associated with it.

In another version, the set of teeth is part of an intermediate member, as described in the document FR 98 11991 applied for on Sep. 23, 1998. The ramp means are in all cases fixed to the set of teeth for rotation with the latter.

The arrangement of a cassette at the outer radial periphery of the mechanism, and especially of the cover plate, results in a static and dynamic imbalance of the mechanism, which gives rise to vibrations that adversely affect good operation of the clutch.

SUMMARY OF THE INVENTION

In order to overcome this disadvantage, the invention proposes a clutch mechanism which is characterised in that the cover plate carries at least one means for prebalancing or balancing in order to compensate for imbalance that is due to the cassette of the compensating device.

The prebalancing means enables the assembly consisting of the cover plate and the cassette to be balanced beforehand, and resides in the provision of a prebalancing rivet and/or a prebalancing mass. The balancing means enables the clutch mechanism to be balanced finally, and consists for example of a balancing rivet.

In accordance with further features of the invention:

the cover plate includes a plurality of housings which are spaced apart circumferentially, and in one of which the cassette is mounted, at least one other of the housings constituting a mounting zone for a prebalancing means such as a prebalancing rivet;

each housing includes a transversely oriented rear base portion;

the base portion of the housing in which the cassette is mounted includes a window;

the transverse base portion of the said further housing constitutes the mounting zone for at least one prebalancing rivet and/or a prebalancing mass;

the transverse base portion of the said further housing constitutes the mounting zone for three prebalancing rivets;

the pressure plate is coupled in rotation to the cover plate by tongues, deformable elastically in the axial direction and having at least one end fixed to the cover plate or to the pressure plate by means of a rivet that constitutes a prebalancing rivet of the mechanism;

the rivet for fastening one end of a tongue to the cover plate is a prebalancing rivet which is diametrically opposed to the cassette;

the cover plate includes an external radially oriented flange for fastening the cover plate to a reaction plate and having holes arranged for fastening at least one balancing rivet;

each balancing rivet is fixed in the region of a widened zone of the said flange which is formed in an aperture for the passage through it of the heads of members for fastening the cover plate to the reaction plate;

the said aperture is formed in an axially oriented skirt which joins the said flange to the transverse base portion of the cover plate.

In another version, the prebalancing rivets are replaced at least partly by masses. In that case, it is no longer essential to provide a prebalancing rivet associated with the tongues.

BRIEF DESCRIPTION OF THE DRAWINGS

Further features and advantages of the invention will appear on a reading of the following detailed description, for an understanding of which, reference will be made to the attached drawings, in which.

DETAILED DESCRIPTION OF THE PREFERRED EMBODIMENT

The drawings show a clutch mechanism that constitutes a unitary assembly which is attached on a reaction plate 100 (see FIG. 4), with insertion of a friction disc 101 between the reaction plate and the pressure plate 1 which is part of the clutch mechanism. The mechanism has an axis of axial symmetry X—X.

In the context of application to a motor vehicle, the reaction plate 100 is fixed to the crankshaft of the internal combustion engine, with which it is rotatable to form a driving shaft, while the friction disc 101 has at its outer periphery friction liners 99 which are fixed to a support plate 98, which may be double, and which is deformable elastically in the axial direction and coupled rigidly or elastically to a hub, the hub being rotatable with it and being, in this example, the input shaft of the gearbox that constitutes the driven shaft. It is the friction liners 99 which are therefore arranged to be gripped releasably between the pressure plate 1 and the reaction plate 100, so as to transmit the torque from the engine of the vehicle to the input shaft of the gearbox. For this purpose, axially acting clutch engaging means 4 are arranged to grip the friction liners between a front transverse friction face 11 which is formed on the front of the pressure plate 1, and a rear transverse friction face formed on the back of the reaction plate (not shown in the drawings), which may be carried by a flexible disc fixed to the crankshaft so as to constitute a flexible flywheel.

The clutch engaging means constitute a unit with disengaging means which are arranged to counteract, as required, the action of the clutch engaging means which engage, firstly on the inner face of a rear cover plate 2, and secondly on engagement means 3 carried by the pressure plate 1, and constituting the rear transverse face of the pressure plate, facing towards the base of the rear cover plate 2.

In another version, the cover plate 2 may be attached on the flexible disc of the flexible flywheel. It is of course possible to provide only a single friction liner 99, with the support member 98 being for example partly encapsulated within the liner 99.

The declutching means comprise for example declutching levers having inner ends on which a clutch release bearing (not shown) acts.

In the example shown in the drawings, the clutch engaging and declutching means are incorporated in a common component which is a so-called diaphragm 4.

The diaphragm 4 has a generally frusto-conical form in the free state, and it has a sinusoidal characteristic curve (of force exerted as a function of its deflection).

The same characteristic curve is obtained with a Belleville ring.

It will be recalled that the diaphragm 4 comprises an external peripheral portion in the form of a Belleville ring portion 41 which constitutes the clutch engaging means. This peripheral portion is extended radially towards the centre, towards the axis X—X of the clutch mechanism, by a central portion which is divided into radial fingers 42 by blind slots 43. The fingers 42 constitute declutching levers, while the slots 43 are open at their inner ends in the central aperture of the diaphragm 4, and at their outer periphery in widened apertures 44 which constitute the blind ends of the slots 43, these apertures 44 being in this example substantially rectangular. The cover plate 2 in this example is in the form of a hollow dish, and has a base with a hole in its centre.

The clutch mechanism therefore comprises, as a unit, an assembly of generally annular components, namely the pressure plate 1 at the front, the cover plate 2 at the rear, and the diaphragm 4 which bears axially, firstly against the base of the cover plate 2, and secondly against the engagement means 3, so as to grip the friction liners axially between the front transverse face 11 of the pressure plate 1 and the corresponding friction face of the reaction plate.

Like the reaction plate, the pressure plate 1 is made of a mouldable material and is for example a casting, and it is coupled in rotation to the cover plate 2 while being able to be displaced axially with respect to the latter. In this example, this coupling is obtained by means of tongues 10 which are deformable elastically in the axial direction, and which are oriented tangentially, being secured, in this case by riveting, to the cover plate 2 at one of their ends 302, while at their other end 301 they are fixed to the pressure plate 1. More precisely, each tongue 10 is fixed to a lug 12 of the reaction plate 1, which is an axial outward projection. The tongues 10 are orientated tangentially. In another version they are orientated radially.

The tongues 10 act as return means for the pressure plate 1. More precisely, the cover plate 2 has, firstly a base portion 21, which has a hole in its centre and which is oriented generally transversely at right angles to the axis X—X, and secondly, means 22 for fastening the cover plate 2 to the reaction plate or, in another version, to another component such as a flexible disc.

The fastening means consist of a radial end flange 22 of the cover plate 2.

An axially oriented annular skirt portion 23 joins the flange 22 to the base portion 21, the flange being directed away from the base portion 21, that is to say in the opposite direction from the axis X—X.

The diaphragm 4 bears axially at the outer periphery of its Belleville ring portion 41 on the engagement means 3, while the inner periphery of its Belleville ring portion 41 is mounted for tilting displacement between two abutments which are in axial face-to-face relationship, and which comprise respectively a secondary abutment 25 carried by fastening lugs 26 which are formed by stamping out and bending in the base portion 21, and a primary abutment 24 which is carried by the base portion 21 of the cover plate 2. In the engaged state of the clutch, the diaphragm 4 is in engagement on the primary abutment and on the engagement means 3 of the pressure plate 1, given that the lugs 26 extend axially through the widened apertures 44 in the diaphragm 4.

In order, when the clutch is engaged, to maintain the axially acting clutch engaging means 4 in a position which is independent of wear in the friction liners 99 of the friction disc, and to a lesser extent wear in the pressure plate 1 and reaction plate 100, the so-called friction faces of which constitute a frictional slipping zone and become worn in contact with the liners of the friction disc, a wear compensating device is provided, which comprises a cassette 30 and an annular adjusting ring 200 having ramps 32.

Figure 5:
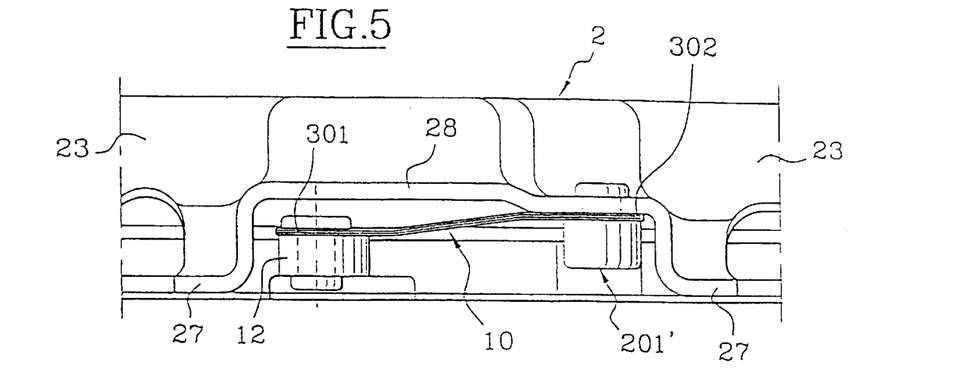
FIGS. 5, 6 and 7 are views seen in the direction of the arrows F5, F6 and F7 in FIG. 1, respectively.

More precisely, the adjusting ring 200 with its ramps 32 is an annular ring which is a reformed sheet metal pressing, the ramps 32 of which are disposed circumferentially at regular intervals, with the adjusting ring 200 also having engagement zones 3 consisting of the rounded upper edges of arcuate press-formed ridges which are centred on the axis X—X of the clutch, and which are placed radially outwards of the ramps 32 (see in particular FIG. 5).

The pressure plate 1 in this example has, on its rear transverse face that faces towards the base portion 21 of the cover plate 2, pads 13 which are made integrally by moulding and which are spaced apart circumferentially at a distance from each other which corresponds to the distance that circumferentially separates two consecutive ramps 32, each of the pads 13 being arranged to cooperate with a ramp 32.

The adjusting ring 200 with its ramps 32 is located axially between the diaphragm 4 and the pressure plate 1, so that the pads 13 are in cooperation with the ramp 32, and so that the diaphragm 4 is in cooperation with the engagement zones 3, which thus constitute the engagement means, which are in this example of divided form but which, in another version, may be continuous, and through which the diaphragm 4 acts on the pressure plate 1.

At least one of the engagement zones 3 of the adjusting ring 200 with its ramps 32 is extended at its outer periphery by a flange 33 parallel to the axis X—X, terminating in a transverse return, that is to say a return extending radially outwards in a plane at right angles to the axis X—X and provided, at its outer periphery, with a set of teeth 31 such that the axially oriented, radially outward flange 33 of the adjusting ring 200 is centred by a thickened portion of the pressure plate 1, in each of which a pad 13 is formed.

The pressure plate 1 therefore has a variable thickness, that is to say, more precisely, than the distance between its leading frontal friction face 11 and the coplanar engagement zones 3 varies as a function of the above mentioned wear.

The cassette 30 of the wear compensating device comprises, in a known way, a ratchet wheel 102 which is fixed to a spindle 104 that also carries a worm 106, the thread and pitch of which are matched to the set of teeth 31, together with a take-up spring 108. These components 102, 104, 106, 108 are carried by a support member 109, which is secured on the flange 22 by riveting. The support member 109 also carries a resilient member 112 with a control tongue 111, which is in cooperation with the teeth of the ratchet wheel 102, and which is actuated by an appendix 112 of the diaphragm 4.

The general operation of the wear compensating device 30, 200 which has just been described briefly is known, and will not be described in detail. If necessary, reference can be made to the contents of French patent application No. 96 11197, published under the number FR-A-2 753 503, of which the corresponding part of the description is to be regarded as forming part of the present Application.

It will be recalled that in the event of wear, the appendix 112 acts on the tongue 111, which causes the wheel 102 to turn in order to arm the spring 108, which, in expanding, pushes the worm 106 so as to rotate the set of teeth 31 and the ring 200 during a declutching operation.

The engagement means 3 for the outer periphery of the Belleville ring 41 of the diaphragm 4 thus consist of an axially oriented, divided, annular boss which is part of the adjusting spring 200, the ramps 32 of which are in cooperation with the rear transverse end, preferably chamfered, of the pads 13, constituting reaction ramps. The worm 106 is disposed tangentially with respect to the set of teeth, while the spindle 104 is fixed to the worm 106.

The cassette 30 of the wear compensating device, in use, enables the ring 200 to be turned so as to compensate for wear which is due mainly to the friction liners of the friction disc. The cassette 30 is mounted by means of its support member 109 on the cover plate 2 before the pressure plate 1 is fastened to the cover plate.

More precisely, the diaphragm 4 is first fixed on the cover plate 2 by means of the fastening lugs 26 as described above, with the diaphragm 4 being mounted for tilting displacement between the two abutments 24, 25. A ring 8, with its lugs 7, is subsequently mounted between the abutment lugs 5 of the cover plate 2, 21 and the inner periphery of the fingers 42 of the diaphragm 4. The diaphragm then occupies a flat position which corresponds generally to that which it occupies once the clutch mechanism is mounted on the cover plate 2.

For more detail as to the ring, reference is made to the document FR 98 01769.

The wear compensating device maintains the diaphragm in this position, which corresponds to the engaged position of the clutch when new. The cassette 30 is subsequently fixed, and a prebalancing operation is carried out.

The pressure plate 1, which in this example carries the means having ramps 32, and which is therefore of variable thickness, is offered up.

Then, the pressure plate 1 is mounted on the cover plate 2. More precisely, the plate 1 being equipped with the tongues 10, the other ends 302 of the tongues 10 are fixed to the cover plate 20, which in this example is a sheet metal pressing.

Finally, a final operation is carried out.

In the present example, the cassette 30 is mounted, before the pressure plate 1 is fixed on the cover plate 2, in a housing 20 which is formed, in this example by press-forming, in a thickened portion of the cover plate 2, in the region of its fastening flange 22. The housing 20 intersects the flange 22 and the skirt portion 23 of the plate, which is thereby superelevated to the level of the housings 20.

The axial base of the housing 20 consists of a transverse zone 1 23 of the skirt portion 23, for joining to the base portion 21 of the cover plate. A window 121 is formed in the said zone 123, parallel to the base portion 21, and offset axially towards the flange 22 with respect to the base portion 21.

The number of tongues 10 depends on the application. In this example, two sets of tongues 10, which may be superimposed on each other, are provided, together with three housings 20. The housings 20, of which there are three in the present case, and the tongues 10, are spaced apart circumferentially, and alternately, at regular intervals.

Only one of the housings 20 is provided with a window 121, namely the one that serves to contain the cassette 30.

The cassette 30, which will be described below, creates an imbalance. For this reason, before the pressure plate 1 is fitted, a prebalancing operation is carried out with the aid of prebalancing rivets 201 which are mounted on the axial base portions 121, unperforated, of the housings 20. Three rivets 201 are provided for each housing 20, not affected by the mounting of the cassette.

A further prebalancing rivet 201' is arranged diametrically opposite to the cassette 30. This rivet 201' serves for the fastening of a set of tongues 10 to the cover plate 2, as can be seen in FIG. 5. The pressure plate 1 is relieved locally in the region of the rivet 201'. All of this is due to the face that the pressure plate is relieved in the region of the cassette 30 so as to provide clearance.

In another version, the rivets 201 of a housing 20 are replaced by a prebalancing mass, which is for example secured by riveting on the axial unperforated base portions 123. Such a mass has been shown at 301 in FIG. 1. In a further version, two rivets 201 are replaced by a mass which is secured by riveting on the base 123.

Finally, balancing rivets 202 (FIG. 6) are placed in the desired position so as to balance the clutch mechanism.

For this purpose, the flange 22 is formed in advance with balancing holes 47 for fitting the balancing rivet or rivets 202 of the clutch mechanism therein. For this purpose, numerous holes 47 have to be provided for locating the rivets 202. In another version, the rivets are replaced by balancing masses.

The flange 22 also has, firstly, fastening holes 29 for passage of the fastening members—such as screws or rivets—through them for fastening the flange 22 to the reaction plate, and secondly, centring holes 48 for the passage of centring pins 148 (FIG. 4), carried by the cover plate, through them.

Apertures 129 are formed in the skirt 23, in the region of the fastening holes 29, in the present case for passage through them of the heads of screws for fastening the cover plate 2 to the reaction plate.

Figure 1:
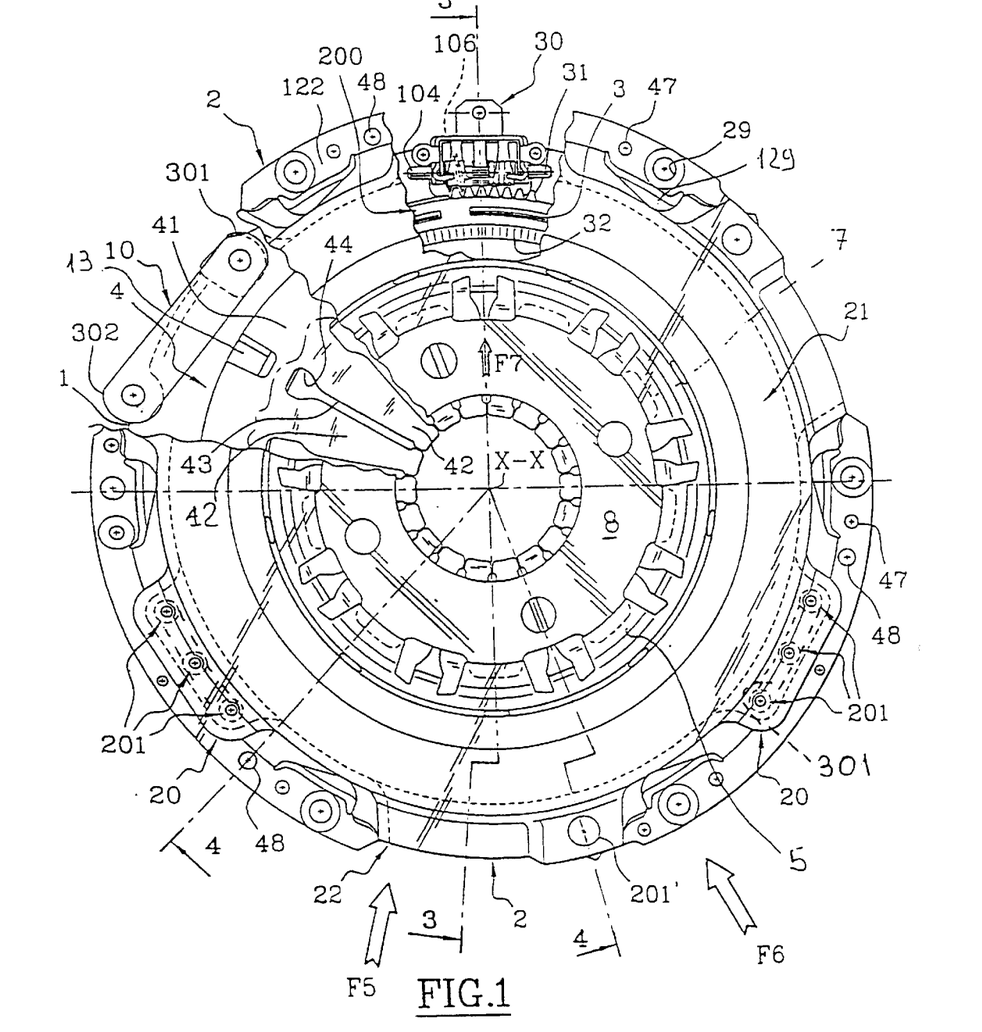
FIG. 1 is a front view of a clutch mechanism in a first embodiment of the invention, partly cut away in some places to show the diaphragm, a tangential braking tongue, and the wear compensating device comprising the cassette and the adjusting ramp ring.
Figure 6:
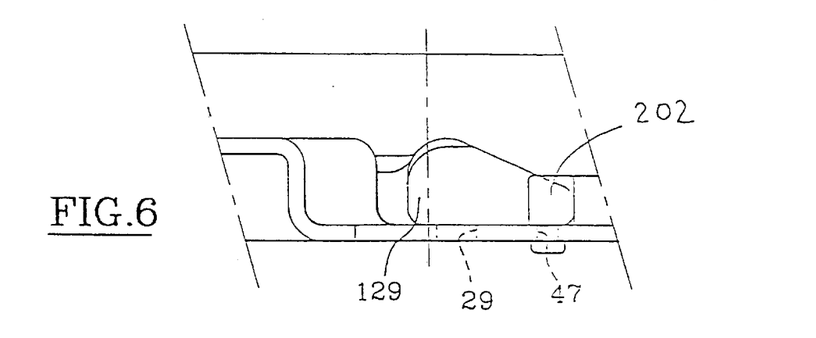

The apertures 129 have an asymmetrical form. The fastening holes 29 and the balancing holes 47 are close to each other. One pair of holes 29, 47 is provided for each aperture 129 (FIG. 6). A housing 20 is disposed between two pairs of holes 29, 47 as can be seen in FIG. 1. The aperture 129 thus enables the engagement surface of the flange 22, for the heads of the fastening screws, to be increased at this region. The aperture 129 is accordingly elongated in the circumferential direction and is deeper in the region of the hole 29, each of the holes 29, 47 is located at the circumferential end of one aperture.

Each balancing rivet 202 is fixed, like the fastening screws, in the region of a widened zone 122 of the flange 22 which is formed at the aperture 129.

Figure 2:
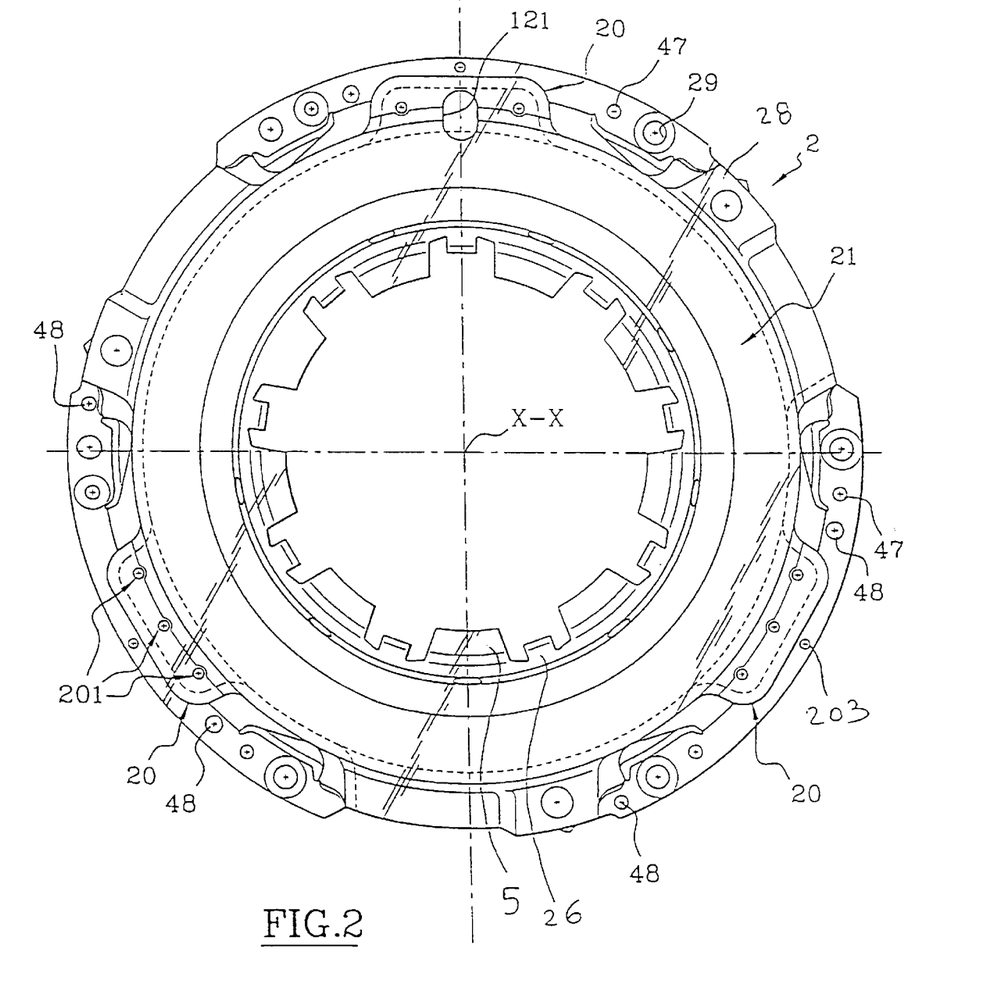
FIG. 2 is a front view of the single cover plate of the mechanism.

The rivet 202 does not extend beyond the zone 122, while the heads of the fastening screws do extend beyond the zones 122. Additional apertures 203 are provided in the flange 22 outside the housings 20 (FIG. 2).

Figure 7:
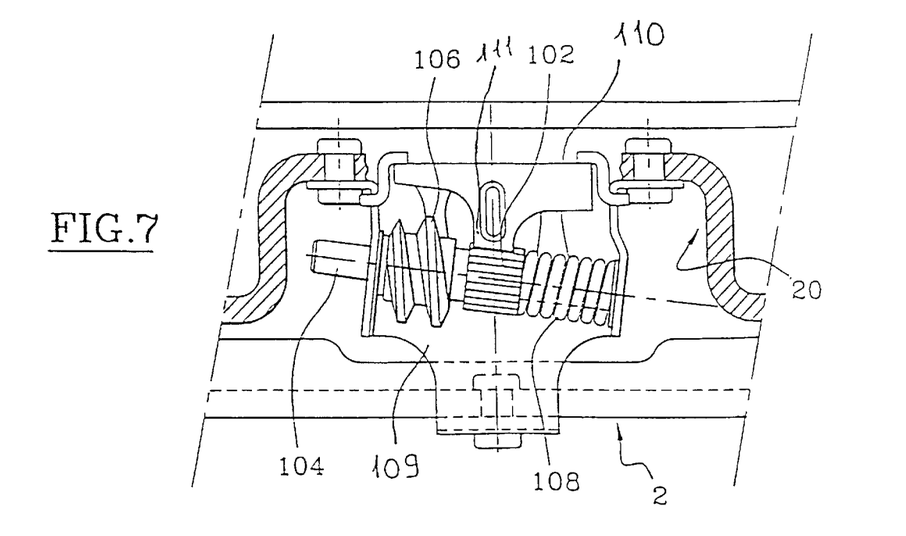

Thus the flange 22 has three fastening zones 27 for contact with the reaction plate 200, which is here of slightly hollow form as can be seen in FIG. 7. These zones 27 (FIG. 5) are arranged alternately, in the circumferential sense, with the zones 28, which are offset axially with respect to the zones 27 towards the base portion 21 of the cover plate 2, for the tongues 10 to be fastened, in the present case by riveting, to the cover plate. The skirt 23 is therefore open at this level, which enables the fastening lugs 12 of the pressure plate 1, projecting radially at its outer periphery, to pass through. The zones 27, serving for fastening the cover plate 2, are longer than the zones 28 for fastening the tongues, which are joined continuously to the zones 27 so as to form a louvre (FIG. 5).

The housings 20 are central in the zones 27, which are narrower at this point. Each end of a zone 27 has a widened zone 122 and an aperture 129.

The holes 29, 47 are therefore disposed, as are the zones 122, on either side of a housing 20 at the ends of a zone 122.

Figure 3:
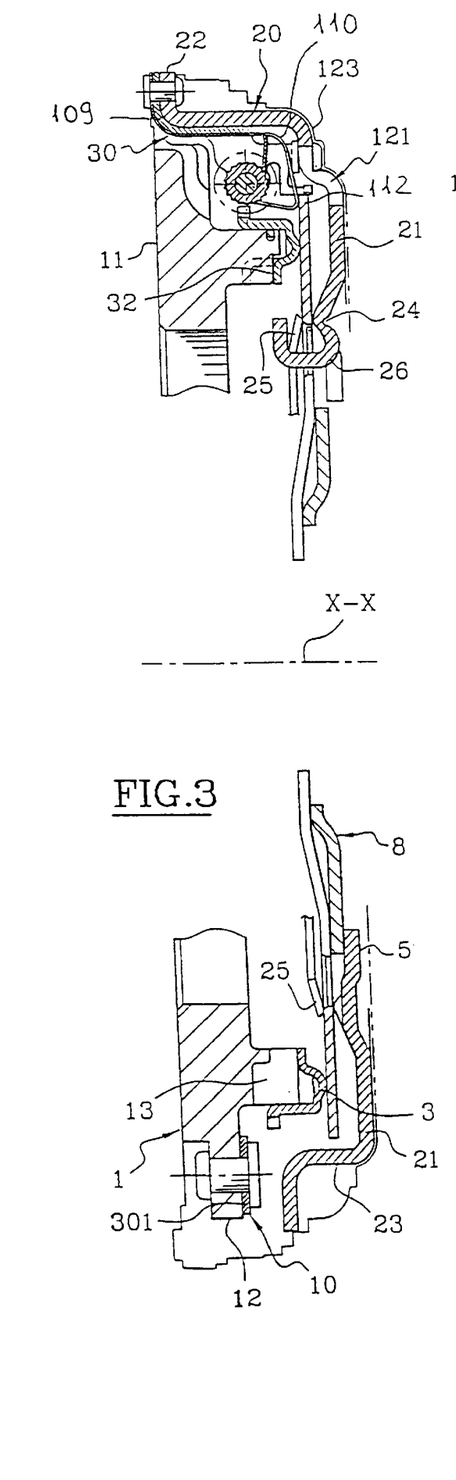
FIGS. 3 and 4 are partial views in cross section taken on the lines 3—3 and 4—4 respectively in FIG. 1.

This enables the clutch mechanism to be well balanced. This is especially so as, FIG. 3, the pressure plate is relieved so as to provide clearance for the cassette 30. The said cassette 30 includes the U-shaped support member 109 with a spine which lies in contact with the deformation of the skirt 23 that defines the summit of the housing 20, and two wing portions are pierced by the passage for the spindle 104, to which is fixed the worm 106 and which is monobloc with the ratchet wheel 102, all interposed between the two wing portions of the support member 109. The worm is adjacent to one of the wing portions, while a helical take-up spring 108 is interposed between the ratchet wheel and the other wing portion.

The support member 109 has three fastening lugs (not given a reference in FIG. 1) for fastening it by riveting to the flange 22 and to the zone 123, and therefore to the cover plate 2.

The flange 33 may of course be coupled in rotation to an intermediate member carrying the set of teeth 31 and located axially on the cover plate, by means for example of extension elements projecting from two superimposed tongues 10. A connection is arranged between the intermediate member and the ring 200, so as to permit axial movement of the pressure plate with respect to the intermediate member while coupling the said intermediate member in rotation to the ring 200. Such an arrangement is described in the document FR 98 11991, applied for on Sep. 23, 1998, to which reference should be made for more detail.

Braking means, comprising for example a braking ring, may for example be interposed between the ring 200 and the pressure plate. For more details, reference should be made for example to the document FR 98 14448 applied for on Nov. 17, 1998, given that the braking ring may be replaced by a tangentially oriented tongue as can be seen in FIG. 2 of the document FR 98 01769 deposited on Feb. 13, 1998, from which the present Application claims priority.

Figure 4:
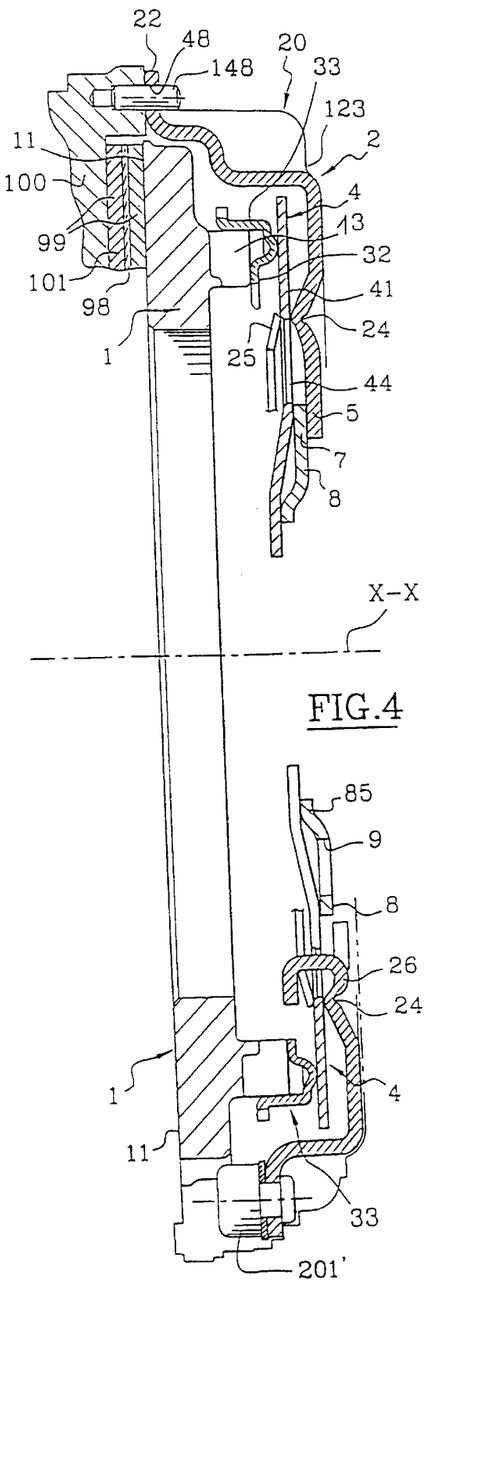

That Application describes the ring 8, of which FIG. 4 shows at 85 the internal engagement on the fingers of the diaphragm, and at 9 one of the holes for a tool for rotating the ring 8. This ring 8 is interposed axially between the fingers 42 of the diaphragm 4 and the abutment lugs 5 formed internally of the base portion 21 of the cover plate. The ring 8 lies radially inward of the lugs 5.

The lugs 5 are wider in the circumferential sense than the lugs 26. The radially oriented lugs 5 are arranged alternately in the circumferential sense at regular intervals with the lugs 26 (FIG. 2). The ring 8 has lugs 7 which can be seen in broken lines in FIG. 1.

These lugs 7 are mounted under the lugs 5 for a bayonet type fitting, by rotating the ring with the aid of one or more tools introduced into the holes 9.

Before the clutch mechanism is mounted on the reaction plate, the ring is put in place, in particular in order to avoid any damage to the cassette. The ring 8 constitutes a support member 8 for a set of locating lugs 7. This member is in contact with declutching levers 42.

After the mechanism has been mounted on the reaction plate, the ring is removed. This ring 8 is balanced so that it is possible to carry out the balancing operation using the rivets 202, with or without the ring 8 being present.

In general terms, the clutch mechanism is not necessarily provided with a ring 8.

As will have been understood, when the prebalancing rivets 201 are at least partly replaced by a mass, the prebalancing rivet 201' can be omitted, the cover plate with the cassette being balanced beforehand by the masses and or the rivets 201.

The cassette 30 may of course be in some other form, for example that which is described in the document FR 98 01453 applied for on Feb. 5, 1998, and in the document PCT/FR99/00261 applied for on Feb. 5, 1998.

Thus, in the light of the Application PCT/FR99/00261, the resilient member may constitute by itself the support for the cassette. The take-up spring may be disposed outside the cassette, being for example located between a pad and a ramp. In that case, the housing of the cover plate may constitute the support for the cassette.

The pads 13 may be replaced by ramps, either projecting from the pressure plate or carried on the latter.

Because of the prebalancing means such as the rivets 201, 201', and/or prebalancing masses, the cover plate 2, equipped with a cassette 30, is balanced beforehand.

The pressure plate, equipped with the remainder of the wear compensating device, is afterwards fitted, and finally, the final balancing of the assembly is carried out. The invention enables the wear compensating device to be easily equipped with braking means or the like, because the clutch mechanism can easily be finally balanced because of the prebalancing, already done, of the cover plate and cassette.

Balancing is therefore easy to achieve.

All combinations are of course possible. Thus, the prebalancing rivets 201 or the prebalancing masses located in the region of the housings 20 which do not have the cassette 30, can be omitted, and prebalancing can be obtained by means of rivets 201' associated with all the sets of tongues 10, with each set comprising at least one tongue 10.

We claim:

1. A clutch mechanism, comprising a rear cover plate (2), a front pressure plate (1) coupled in rotation to the cover plate (2) while being displaceable axially with respect to the latter, engagement means (3) carried by the pressure plate (1), axially acting clutch engagement means (4, 41) acting between the cover plate (2) and the engagement means (3), and a wear compensating device comprising, firstly, ring means (200) having ramps (32) carried by the pressure plate (1), which are fixed in rotation to an external set of teeth (31) and which are placed between the pressure plate (1) and the engagement means (3) so as to constitute a pressure plate (1, 200) having a variable thickness between its friction face (11) and the engagement means (3), and comprising, secondly, a cassette (30) mounted in a housing (20) of the cover plate (2) and comprising a support member with a worm (106) in cooperation with the set of teeth (31) fixed in rotation to the ramp means (32), the cover plate carries at least one means (201, 201', 202) for at least of prebalancing and balancing in order to compensate for imbalance that is due to the cassette (30) of the wear compensating device (30, 200).

2. A clutch mechanism according to claim 1, wherein the cover plate (2) includes a plurality of housings (20) which are spaced apart circumferentially, and in one of which the cassette is mounted, at least one other of the housings constituting a mounting zone for a prebalancing means (201) such as a prebalancing rivet.

3. A mechanism according to claim 2, wherein each housing (20) includes a transversely oriented rear base portion (123).

4. A mechanism according to claim 3, wherein the base portion (123) of the housing in which the cassette (30) is mounted includes a window (121).

5. A mechanism according to claim 3, wherein the transverse base portion (123) of the housing constitutes the mounting zone for at least one prebalancing rivet (201) and a prebalancing mass.

6. A clutch mechanism according to claim 5, wherein the transverse base portion (123) of the housing constitutes the mounting zone for three prebalancing rivets (201).

7. A clutch mechanism according to claim 1, wherein the pressure plate (1) is coupled in rotation to the cover plate (2) by sets of at least one tongue (10), deformable elastically in the axial direction, having at least one end fixed to at least one of the cover plate (2) and the pressure plate (1) by means of a rivet (201') that constitutes a prebalancing rivet of the mechanism.

8. A mechanism according to claim 7, characterised in that the rivet (201') for fastening to the cover plate (2) one end of a set of at least one tongue (10) is a prebalancing rivet (201') which is diametrically opposed to the cassette.

9. A mechanism according to claim 1, wherein the cover plate (2) includes an external radially oriented flange (22) for fastening the cover plate (2) to a reaction plate and having holes (47) arranged for fastening at least one balancing rivet (202).

10. A mechanism according to claim 9, wherein each balancing rivet (202) is fixed in the region of a widened zone (122) of said flange (22) which is formed in an aperture (129), for the passage through it of the heads of members for fastening the cover plate (2) to the reaction plate.

11. A mechanism according to claim 10, wherein said aperture (129) is formed in an axially oriented skirt (23) which joins the said flange (22) to the transverse base portion of the cover plate (2).

* * * * *